(12) United States Patent
Shaffer et al.

(10) Patent No.: US 9,363,377 B2
(45) Date of Patent: Jun. 7, 2016

(54) SYSTEM AND METHOD FOR OPTIMIZING AGENT LOGIN IN A CONTACT CENTER

(71) Applicant: Avaya Inc., Basking Ridge, NJ (US)

(72) Inventors: Shmuel Shaffer, Palo Alto, CA (US); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 401 days.

(21) Appl. No.: 13/922,555

(22) Filed: Jun. 20, 2013

(65) Prior Publication Data

US 2014/0379890 A1 Dec. 25, 2014

(51) Int. Cl.
- G06F 15/173 (2006.01)
- H04M 3/523 (2006.01)
- G06Q 10/06 (2012.01)
- H04M 3/51 (2006.01)

(52) U.S. Cl.
CPC ............. *H04M 3/5237* (2013.01); *G06Q 10/06* (2013.01); *H04M 3/523* (2013.01); *H04M 3/5233* (2013.01); *H04M 3/5133* (2013.01); *H04M 2203/402* (2013.01); *H04M 2203/404* (2013.01); *H04M 2203/406* (2013.01)

(58) Field of Classification Search
CPC ............... H04M 2203/404; H04M 2203/402; H04M 3/5233; H04M 3/523; G06Q 10/06
USPC ......................................................... 709/224
See application file for complete search history.

(56) References Cited

U.S. PATENT DOCUMENTS

| | | | | |
|---|---|---|---|---|
| 2006/0239440 A1* | 10/2006 | Shaffer | .................. | H04M 3/523 379/265.02 |
| 2012/0059934 A1* | 3/2012 | Rafiq | .................. | H04L 67/1008 709/225 |
| 2012/0219138 A1* | 8/2012 | Mandalia | ............ | H04M 3/5175 379/202.01 |
| 2012/0259976 A1* | 10/2012 | Bhagat | .................. | G06F 9/5083 709/224 |
| 2013/0148800 A1* | 6/2013 | Lyman | ................ | H04M 3/5141 379/265.04 |
| 2015/0213512 A1* | 7/2015 | Spievak | ............. | G06Q 30/0275 705/14.71 |

* cited by examiner

Primary Examiner — Richard G Keehn

(57) ABSTRACT

An agent login optimization system for optimizing login of agents at communication managers of a contact center is provided. The agent login optimization system includes a monitoring module for monitoring predetermined activities at a plurality of communication managers in the contact center. The monitoring includes monitoring call traffic at the plurality of communication managers and monitoring login requests of agents. The agent login optimization system further includes a determination module configured to determine a suitable communication manager from the plurality of communication managers based upon the monitoring to login an agent. The agent login optimization system further includes an agent login module for logging the agent into the suitable communication manager.

18 Claims, 3 Drawing Sheets

SYSTEM AND METHOD FOR OPTIMIZING AGENT LOGIN IN A CONTACT CENTER

BACKGROUND

1. Field of the Invention

Embodiments of the present invention provide a system and a method for optimizing usage of resources of a contact center for improving efficiency. More particularly, embodiments of the present invention provide a system and a method for optimizing login of agents at communication managers in a large call center.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

Contact centers distribute contacts, whether inbound or outbound, for servicing to any suitable resource according to predefined criteria. In many existing systems, the criteria for servicing the contact from the moment the contact center becomes aware of the contact until the contact is connected to an agent are client or operator-specifiable (i.e., programmable by the operator of the contact center), via a capability called vectoring. Currently, when a system controller of an automated call distribution (ACD) system detects an agent has become available to handle a contact, the controller identifies all predefined contact-handling queues for the agent, usually in some order of priority, and delivers to the agent the highest-priority, oldest contact that matches the agent's highest-priority queue. Generally, the only condition that results in a contact not being delivered to an available agent is where there are no contacts waiting to be handled.

The primary objective of contact center management is to ultimately maximize contact center performance and profitability. An ongoing challenge in contact center administration is monitoring and optimizing contact center efficiency. Some single-pool contact centers treat the agents as a single pool of resources and views the callers as a single pool of contacts with various needs. Further, agents are typically associated with a specific communication manager ("CM") and ACD. In a large contact centers, there are typically many communication managers to direct incoming calls to agents associated with them.

Before routing an incoming call, intelligent customer routing (ICR) polls various communication managers in order to determine a contact center for best service routing to which an incoming call should be routed. However, due to performance reasons, polling is ordinarily limited to a rate of not greater than about one second per poll. With some call management systems (CMS), the polling is limited to a rate of about once per three-second interval. For systems of the known art, if multiple agents on a given call manager finish their tasks between polling periods (e.g., 100 agents free up on a particular communication manager such as CM 3), the systems would direct next 100 calls to the specific call manager (i.e., CM 3) to be handled by the free agents. This scenario, also known as agent surplus, may result in a spike of incoming calls directed at a specific call manager.

In a large call center with a large number of call managers (e.g., some systems may have seventeen CMs), traffic calculations assume that calls are evenly distributed among the plurality of 'CMs', smoothing the influx of incoming calls for any given call manager. During an agent surplus scenario as discussed above, all of the incoming calls are directed to a specific call manager, due to which, the specific call manager may get overwhelmed resulting in performance deterioration of the contact center. For large call centers, an agent surplus scenario may result in a greater rate of arrival of calls at any given call manager (i.e., greater than the average arrival of calls at each call manager), thereby putting burden on the particular call manager and resulting in performance deterioration of the contact center. When designing a large call center to accommodate spikes in call arrival rate at any given call manager, additional call managers need to be factored in to ensure proper operation under these spikes. The increased number of required call managers reduces the appeal of the single-pool system and adversely impact the competitiveness of such systems.

Conventionally, this problem has been solved by over-engineering capacity at all communication managers, but that also leads to inefficient usage of resource and higher costs. Further, in high traffic scenarios, overload protection may also result in customer calls being dropped.

Therefore, there is a need for a system and method that is capable of addressing above issues of controlling call traffic at a particular communication manager and further optimizing resources of the contact center in order to improve efficiency.

SUMMARY

Embodiments in accordance with the present invention provide an agent login optimization system for optimizing login of agents at communication managers in a contact center. The agent login optimization system includes a monitoring module for monitoring predetermined activities at a plurality of communication managers in the contact center. The agent login optimization system further includes a determination module for determining a suitable communication manager from the plurality of communication managers based upon the monitoring to login an agent. The agent login optimization system further includes an agent login module for logging the agent into the suitable communication manager.

Embodiments in accordance with the present invention further provide a computer-implemented method for optimizing agent login at communication managers in a contact center. The computer-implemented method includes monitoring predetermined activities at a plurality of communication managers in the contact center. The computer-implemented method further includes determining a suitable communication manager from the plurality of communication managers based upon the monitoring to login an agent. The computer-implemented method further includes dynamically logging the agent into the suitable communication manager.

Embodiments in accordance with the present invention further provide a computer readable medium storing computer readable instructions when executed by a processor performs a method. The method includes monitoring predetermined activities at a plurality of communication managers in the contact center. The method further includes determining a suitable communication manager from the plurality of communication managers based upon the monitoring to login an agent. The method further includes dynamically logging the agent into the suitable communication manager.

Further, the present invention can provide a number of advantages depending on its particular configuration. First, the present invention provides for optimizing system resources by balancing available resources automatically across available communication managers (CMs) and automated call distribution (ACD) systems, based on dynamic call traffic parameters. Second, the present invention provides for optimizing agent login across all available communication managers and ACD systems. Third, the present invention provides for controlling call traffic at a particular communication manager, by dynamically migrating agents of the particular communication manager (or ACD) at another communication manager (or ACD). Fourth, the present invention is applicable to multi-channel contact center (e.g., email, web, phone, SMS, posting to social media sites, posting to blogs, chats). Moreover, the present invention provides automated optimization of agent affinity based on dynamic load conditions in a contact center environment.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
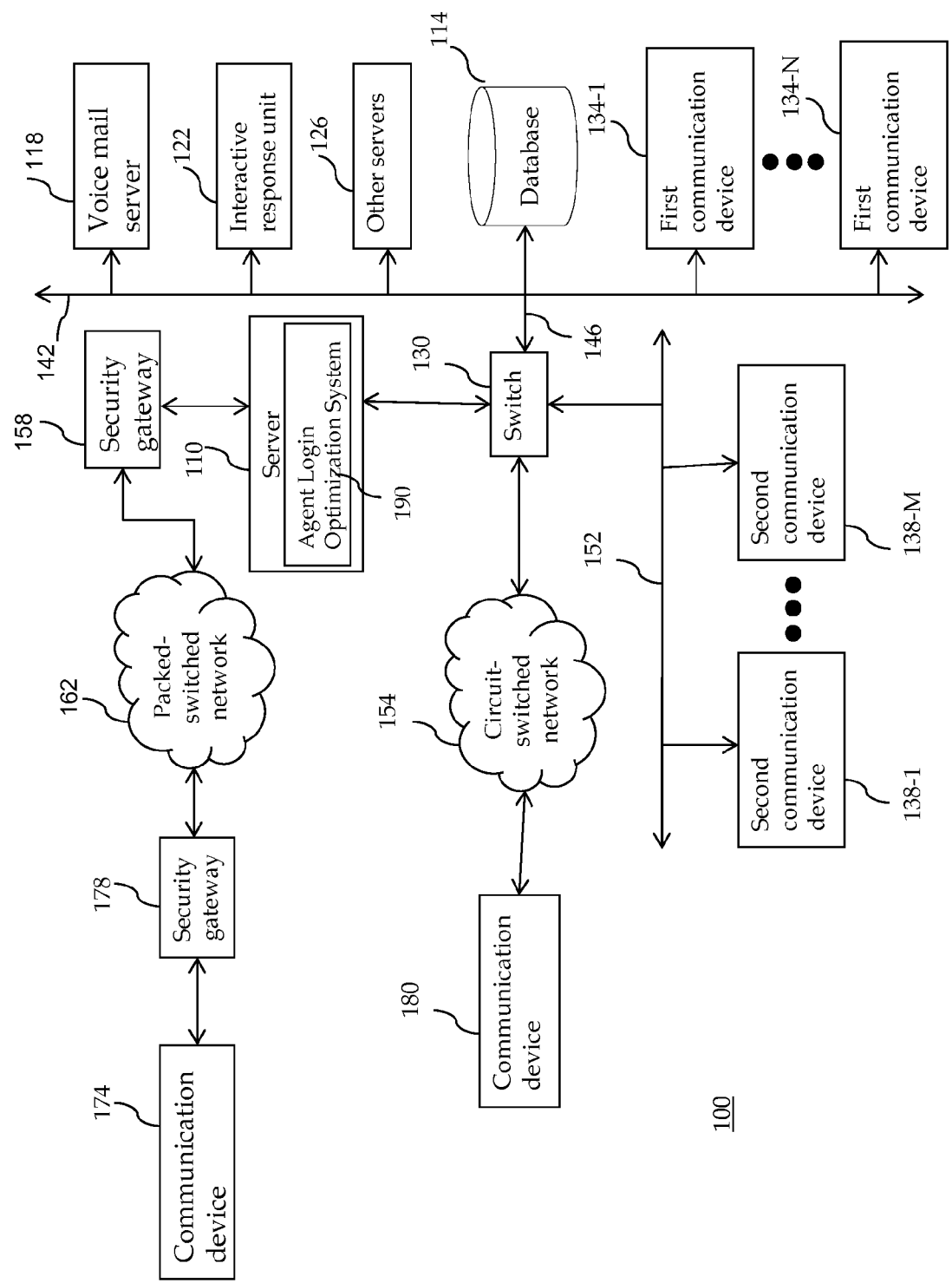
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention may be illustrated below in conjunction with an exemplary communication system, e.g., the Avaya Aura® system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched communication devices 134-1 to N (e.g., computer work stations or personal computers), and/or circuit-switched communication devices 138-1 to M, all interconnected by a communication network 142 that may be a local area network (LAN) or wide area network (WAN), either of which are generically referred to herein as LAN 142. The servers can be connected via optional communication lines 146 to the switch 130. As will be appreciated, the other servers 126 can also include a scanner that is normally not connected to the switch 130 or Web server, VoIP software, video call software, voice messaging software, an IP voice server, a fax server, a web server, an email server, and the like. The other servers 126 may include servers to receive textual contacts e.g., emails, web chats, social media chats, and instant messages. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks. The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

In an embodiment, the gateway 158 of FIG. 1 can be Avaya Inc.'s, G700 Media Gateway™ and may be implemented as hardware such as via an adjunct processor or as a chip in the server.

The first communication devices 134-1 . . . 134-N are packet-switched and can include, for example, hardware-based IP such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1 . . . 138-M are circuit-switched. Each of the communication devices 138-1 . . . 138-M corresponds to one of a set of internal extensions Ext1 . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

Figure 2:
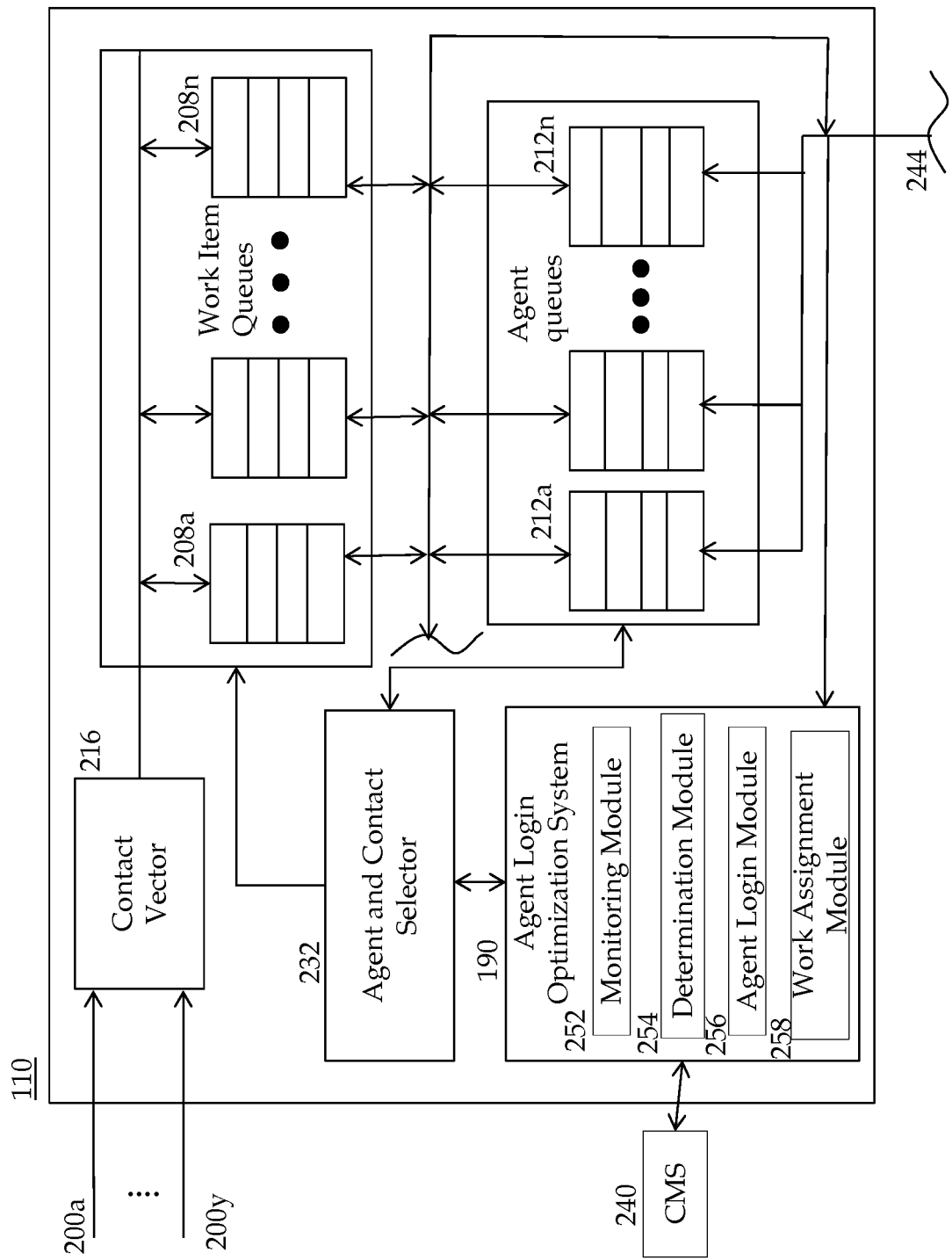
FIG. 2 is a block diagram of a server according to an embodiment of the present invention.

Further, as shown in FIG. 1, the contact center comprises the server 110, configuration of which is explained further in conjunction with FIG. 2 of the present invention. The server 110 further comprises an agent login optimization system 190 as a preferred embodiment of the present invention. The detailed configuration of the agent login optimization system 190 is also explained further in conjunction with FIG. 2 of the present invention.

In an exemplary embodiment, the agent login optimization system 190 is configured to monitor incoming call traffic at multiple communication managers resident at the contact center 100. Further, the agent login optimization system 190 may monitor other predetermined operation statistics of the contact center 100 including, but are not restricted to, agent responsiveness time for new work requests, average handling time of work requests, target revenue of sales team and so forth. The call traffic may further include, but is not restricted to, telephone calls, web chats, audio messages, video messages, text messages, postings to social media sites, and postings to blog sites. In an embodiment, one or more software bots may be configured to detect postings to social media sites and blog sites that are related to services provided by the contact center. The software bots may further be configured to share related media postings with the agent login optimization system 190 and with the supervisor of the contact center.

The agent login optimization system 190 may further have access to the database 114, having stored therein personal and professional details of all the employees of the contact center. The agent login optimization system 190 may also migrate agents from one communication manager into another communication manager to balance arriving call traffic.

In an embodiment of the present invention, the agent login optimization system 190 is configured to detect one or more overloaded communication manager (or ACD) from multiple communication managers (or ACD) at the contact center. The agent login optimization system 190 further determines another communication manager, from the multiple communication managers resident at the contact center 100, that has sufficiently available capacity to absorb call traffic from the overloaded communication manager.

The agent login optimization system 190 further logins an agent associated with overloaded communication manager into another communication manager, and further assigns the incoming call to the agent of the overloaded communication manager logged-in into another communication manager. The agent login optimization system 190 dynamically balances call traffic load at the multiple communication managers or automatic call distribution systems at the contact center, by migrating agents from one communication manager/ACD having a call traffic exceeding a predetermined threshold or about to exceed to another communication manager/ACD having an average or below average call traffic.

Further, the agent login optimization system 190 monitors requests of agents at time of their login. Whenever a new request comes from an agent, the agent login optimization system determines most appropriate (or suitable) automatic call distribution (ACD) or communication manager (CM) to login the agent. In an embodiment, the most appropriate ACD or CM to login the agent is decided based upon a call traffic load across the ACDs or CMs. For example, an ACD or CM having minimum call traffic load may be selected to login the agent. The agent login optimization system 190 keeps on monitoring the agent logins and call traffic in the contact center and provides continuous balancing of agent logins to ensure even distribution of agents across available ACDs and CMs. Furthermore, in an embodiment of the present invention, the agent login optimization system 190 determines a suitable ACD or CM for an agent based on affinity of the agent to a particular geographic location.

FIG. 2 illustrates an embodiment of server 110. Server 110 is in communication with a plurality of customer communication lines 200*a-y*, which can be one or more trunks, phone lines, etc., and agent communication line 240, which can be a voice-and-data transmission line such as LAN 142, as shown in FIG. 1, and/or a circuit switched voice line. Server 110 can include an operational contact center reporting module (not shown), such as Avaya IQ™, CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

Moreover, as shown in FIG. 2, among the data stored in server 110 is a set of contact queues (or contact pool) 208*a-n* and a separate set of agent queues (or agent pool) 212*a-n*. Each contact pool 208*a-n* corresponds to a different set of agent pool, as does each agent in the agent pool 212*a-n*. Conventionally, contacts are prioritized and are either enqueued in individual ones of the contact queues 208*a-n* in their order of priority, or are enqueued in different ones of a plurality of contact queues that correspond to a different priority. Likewise, each agent is associated with a communication manager (not shown in the figure), and the communication manager directs an incoming call to the agents, who are logged-in into that particular communication manager based upon agent skills and requirement of caller. In an embodiment of the present invention, there are multiple communication managers (e.g., in a large contact center) resident in the contact center. Further, each agent's pools are prioritized according to his or her level of expertise or skill and in that pool, and either agents are enqueued in individual ones of agent queues 212*a-n* in their order of expertise level or are enqueued in different ones of a plurality of agent pools 212*a-n* that correspond to a pool and each one of which corresponds to a different expertise level.

Included among the control programs in server 110 is a control vector 216 that controls work item routing process. Contacts incoming to the contact center are assigned by the control vector 216 to different contact pools 208*a-n* based upon a number of predetermined criteria, including customer identity, customer needs, contact center needs, current contact center queue lengths, customer value, and the agent skill that is required for the proper handling of the contact. Agents who are available for handling contacts are assigned to agent pools 212*a-n* based upon the skills that they possess. An agent may have multiple skills, and hence may be assigned to multiple agent pools 212*a-n* simultaneously. Furthermore, an agent may have different levels of skill expertise (e.g., skill levels 1-N in one configuration or merely primary skill levels and secondary skill levels in another configuration), and hence may be assigned to different agent pools 212*a-n* at different expertise levels.

In one configuration, the contact center is operated by a contract operator, and each of the contact pools 208*a-n*, and possibly each of the agent pools 212*a-n*, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

According to at least one embodiment, an agent and contact selector 232 (hereinafter, "selector 232") is provided. The selector 232 and the agent login optimization system 190 are embodied in the server 110. Further, the selector 232 monitors the occupants of the work item and pools 208*a-n* and 212*a-n*, respectively, and contact center objectives, rules, and policies and assigns agents to service work items. As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the selector 232 forwards instructions to the component to forward or route the contact to a specific contact center resource, such as the interactive response unit 122, the voice mail server 118, and/or first or second communication device 134, 138 associated with a selected agent. The selector 232 distributes and connects these contacts to communication devices of available agents based on the predetermined criteria noted above. When the selector 232 forwards a voice contact to an agent, the selector 232 also forwards customer-related information from databases 114 to the agent's computer work station for previewing and/or viewing such as by a pop-up display to permit the agent to better serve the customer. The agents process the contacts sent to them by the selector 232.

The agent login optimization system 190, as shown in FIG. 2, includes certain modules, such as, but not restricted to, monitoring module 252, determination module 254, agent login module 256, and work assignment module 258.

The monitoring module 252 is configured to monitor predetermined activities at a plurality of communication managers in the contact center. In an embodiment of the present invention, the monitoring module 252 monitors call traffic at the plurality of communication managers and automatic call distribution systems. The call traffic may include, but not limited to, telephone calls, web chats, audio messages, video messages, text messages, postings to social media sites, and postings to blog sites. Further, the call traffic may include incoming call traffic and outgoing call traffic from the contact center. If a lot of agents gets available at a particular communication manager, then lot of calls may be forwarded to that particular communication manager/ACD, which may result in breach of a threshold in incoming call traffic handling capacity of the particular communication manager/ACD. In an embodiment of the present invention, the monitoring module 252 is configured to detect the breach in a predetermined threshold of the incoming call traffic at a particular communication manager (e.g., a first communication manager) from the plurality of communication managers/ACDs in the contact center. In another embodiment of the present invention, the monitoring module 252 is configured to detect large arrival rate of incoming calls at the first communication manager, and the predetermined threshold of the incoming call traffic is about to breach. In an embodiment of the present invention, the predetermined threshold is about three times of average call traffic at the first communication manager. For example, if the average call traffic at a communication manager is 100 calls per minute, then the predetermined threshold is 300 calls per minute.

Further, in an embodiment of the present invention, the incoming call traffic at a communication manager may have two thresholds, i.e., upper threshold of calls and lower threshold of calls. The monitoring module 252 is configured to detect a breach in upper threshold of call traffic, as discussed above. The monitoring module 252 is further configured to detect a breach in lower threshold of call traffic at the communication managers. In an embodiment, the lower threshold of call traffic is half of average call traffic at a communication manager. For example, if average call traffic at the communication manager is 100 calls per minute, then the lower threshold of call traffic is 33 calls per minute. If the call traffic at the communication manager has been dropped below a threshold, the agent login optimization system 190 detects it, and logs agents from another communication manager having more traffic in the communication manager having less traffic.

Furthermore, the monitoring module 252 is configured to monitor requests of agents at time of their login. If a new request comes from an agent to login into a communication manager, the agent login optimization system 190 first determines a suitable communication manager to login the agent.

In an embodiment of the present invention, the suitable communication manager is based on a call traffic load at the communication managers resident at the call center. In another embodiment of the present invention, the suitable communication manager is based on an agent affinity towards a geographic location.

The determination module 254 is configured to determine a suitable communication manager and automatic call distribution system from the plurality of communication managers and automatic call distribution system based upon predetermined rules to login an agent. In an embodiment of the present invention, the predetermined rules include current call traffic at other communication managers/ACDs. For example, if the call traffic at a first communication manager is above the predetermined threshold, and the call traffic at the second communication manager is below the predetermined threshold, then the determination module 254 may select the second communication manager to login the agent (who was previously logged-in into the first communication manager). If there are more than one communication manager, wherein the call traffic is below the predetermined threshold, then the determination module 254 may select a communication manager having minimum call traffic load to login the agent. The determination module 254 is further configured to select a suitable agent from a plurality of agents associated with the first communication manager for handling the incoming call based on required skill set to handle the call.

Further, whenever a new request comes from an agent, the determination module 254 is configured to determine most appropriate (or suitable) automatic call distribution (ACD) or communication manager (CM) to login the agent. In an embodiment of the present invention, the determination module 254 determines the most appropriate ACD or CM to login the agent based upon a load of call traffic across the ACDs or CMs. For example, an ACD or CM having minimum call traffic load may be selected to login the agent. In another embodiment of the present invention, the determination module 254 determines the suitable ACD or CM for an agent based on affinity of the agent to a particular geographic location.

The agent login module 256 is configured to login an agent into the suitable communication manager. The agent login module 256 is configured to migrate agents dynamically across the plurality of communication managers or ACDs in order to smooth out arrival rate of calls or call traffic at the communication managers or ACDs. The migration of agents is triggered based upon call traffic at one of communication manager from the plurality of communication managers exceeds the predetermined threshold or is about to exceed or a new login request comes from an agent. The agent login module 256 is further configured to login the agent back into the first communication manager (i.e., native communication manager), when the call traffic at the first communication manager is within threshold.

Further, in an optional step, the agent login optimization system 190 includes the work assignment module 258. The work assignment module 258 is configured to assign an incoming call to the agent logged-in into the suitable communication manager. The agent may handle the call and complete work request requested by the caller. Hence, the agent login optimization system 190 balances call traffic load across the plurality of communication managers. In an embodiment of the present invention, the agent login optimization system 190 treats the plurality of communication managers as a single pool of resources and treats the call request as another pool requiring treatment. The agent login optimization system 190 further optimizes agent login in the contact center by migrating agents dynamically across the communication managers based upon call traffic load.

For example, if a particular contact center has seventeen communication managers (CMs), and call traffic at a particular communication manager (e.g., CM 5, ACD 5) is about to exceed a predetermined threshold, then the agent login optimization system 190 may determine another communication manager (e.g., CM 3, ACD 3), which has average or below average call traffic. The agent login optimization system 190 may login an agent associated with CM 5 into CM 3, so that the call traffic load gets balanced. Further, once the call traffic load at CM 5 is within threshold or normal, then agent login optimization system 190 may dynamically login the agent back into CM 5 (i.e., his native CM) from CM3.

Figure 3:
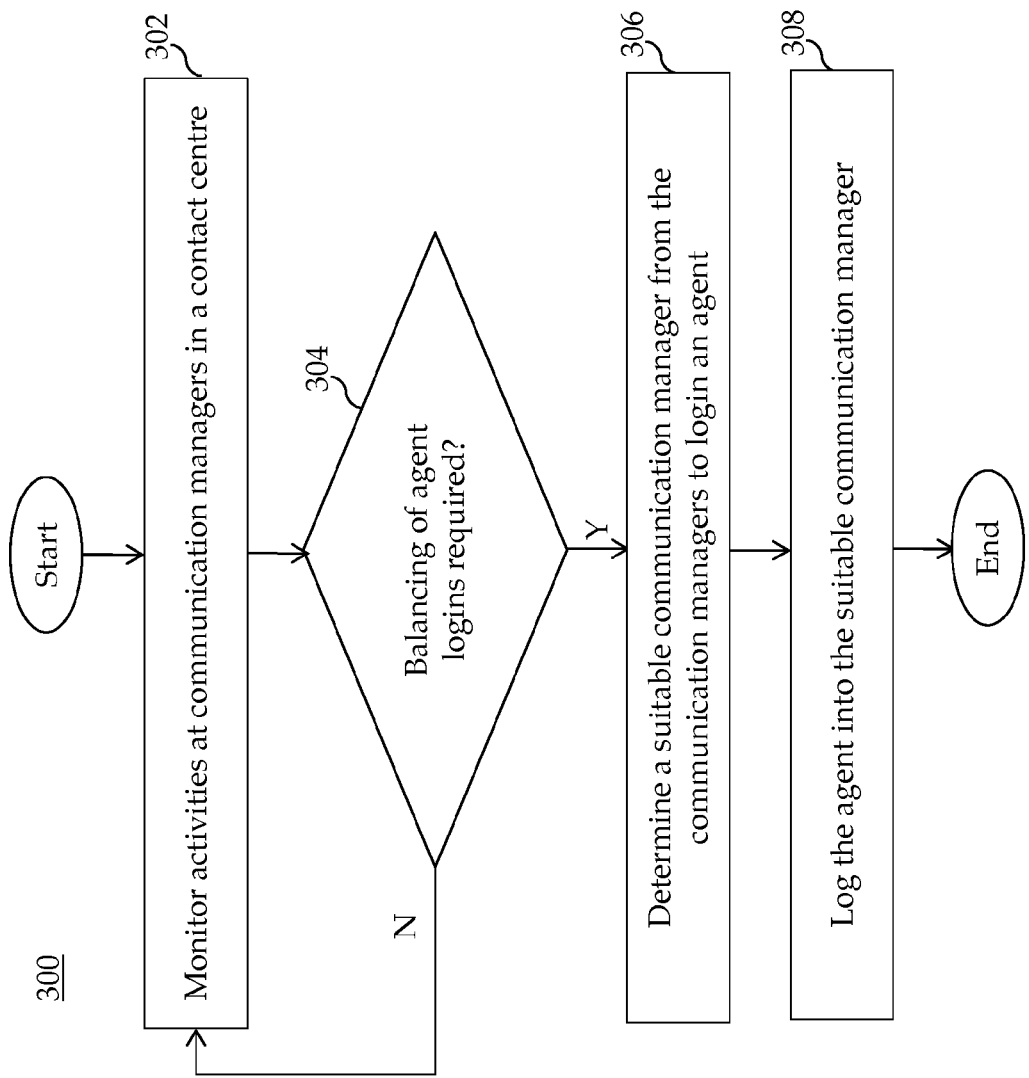
FIG. 3 is a flowchart of a method for optimizing agent login at communication managers in a contact center, in accordance with an embodiment of the present invention.

FIG. 3 is a flowchart of a method 300 for optimizing login of agents at communication managers in a contact center. At step 302, predetermines activities are monitored at a plurality of communication managers or automated call distribution systems in the contact center. In an embodiment of the present invention, the monitoring includes monitoring call traffic load at the plurality of communication managers or automated call distribution systems. The call traffic includes telephone calls, web chats, audio messages, video messages, text messages, postings to social media sites, and postings to blog sites. The monitoring further includes monitoring login requests of agents in the contact center. In an embodiment of the present invention, the monitoring module 252 may monitor the activities at the plurality of communication managers.

At step 304, it is determined whether balancing of agent logins is required. In an embodiment of the present invention, the balancing of agent logins is triggered when a predetermined threshold of the incoming call traffic has been breached at one of a communication manager from the plurality of communication managers. In an embodiment of the present invention, the predetermined threshold is about three times of average call traffic at the first communication manager. Further, the balancing of agent logins is triggered based upon login request of an agent in the contact center. In an embodiment of the present invention, the monitoring module 252 may determine whether the balancing of agent logins is required.

At step 306, a suitable communication manager is determined from the plurality of communication managers based upon the monitoring to login an agent. In an embodiment, the suitable communication manager is determined based upon predetermined rules. In an embodiment of the present invention, the suitable communication manager to login the agent is determined from the plurality of communication managers based upon call traffic load across the plurality of communication managers. In another embodiment of the present invention, the suitable communication manager to login the agent is determined from the plurality of communication managers based upon an affinity of the agent for a geographic location. The suitable communication manager may be determined whenever call traffic at one of communication manager exceeds a predetermined threshold. Further, whenever a new request comes from an agent, a most appropriate (or suitable) automatic call distribution (ACD) or communication manager (CM) to login the agent is determined. In an embodiment of the present invention, the most appropriate ACD or CM to login the agent is decided based upon a load of call traffic across the ACDs or CMs. In an embodiment, an ACD or CM having minimum call traffic load may be selected to login the agent. In an embodiment of the present invention, the determination module 254 may determine the suitable communication manager from the plurality of communication managers.

At step 308, the agent is dynamically logged into the suitable communication manager. In an embodiment, the agents are dynamically migrated across the plurality of communication managers in order to smooth out arrival rate of calls. The migration of agents is triggered based upon predetermined activities. For example, the migration of agents is triggered when call traffic at one of communication manager the plurality of communication managers exceeds the predetermined threshold. The migration of agents is also triggered when a new login request from an agent comes in the contact center. In an embodiment of the present invention, the agent login module 256 may dynamically login an agent into the suitable communication manager.

The agent logins and call traffic in the contact center may be continuously monitored and continuous balancing of agent logins may be provided to ensure even distribution of agents across available ACDs and CMs.

Further, in an optional step, an incoming call is assigned to the agent logged-in into the suitable communication manager. The agent may handle the call and complete work request requested by a caller. In an embodiment of the present invention, the work assignment module 258 may assign the incoming call to the agent of the first communication manager logged-in into the second communication manager.

Further, in an optional step, the agent may be logged back into the first communication manager when the call traffic at the first communication manager is within threshold. The call traffic load is automatically balanced across the plurality of communication managers. In case, call traffic at a particular communication manager again breaches the threshold, then above method may be repeated to balance the call traffic across the plurality of communication managers and bring back the call traffic at the particular communication manager within the threshold.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example, in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising a hardware processor coupled to memory, wherein the processor executes program code stored in the memory to optimize login of agent computers at communication manager servers in a contact center by:
    monitoring call traffic at a plurality of communication manager servers in the contact center;
    determining a high-call-traffic communication manager server by determining whether the call traffic at one of the communication manager servers from the plurality of communication manager servers exceeds a first threshold;
    selecting an agent computer associated with an agent having a skill set required by the high-call-traffic communication manager server; and
    logging the agent computer into the high-call-traffic communication manager server.

2. The system of claim 1, wherein the call traffic comprises calls, web chats, audio messages, video messages, text messages, postings to social media sites, and postings to blog sites.

3. The system of claim 1, wherein the processor is further programmed to optimize login of agent computers at communication manager servers in the contact center by monitoring login requests of agent computers.

4. The system of claim 3, wherein selecting an agent computer associated with an agent having a skill set required by the high-call-traffic communication manager server further comprises the processor selecting the agent computer further based on the login requests of the agent computers.

5. The system of claim 3, wherein: selecting an agent computer associated with an agent having a skill set required by the high-call-traffic communication manager server further comprises the processor selecting the agent computer further based upon an affinity of the agent associated with the agent computer for a geographic location.

6. The system of claim 1, wherein:
    the processor is further programmed to optimize login of agent computers at communication manager servers in the contact center by:
        determining a low-call-traffic communication manager server by determining whether the call traffic at one of the communication manager servers from the plurality of communications manager servers is lower than a second threshold; and
        selecting, by the processor, an agent computer associated with an agent having a skill set required by the high-call-traffic communication manager server comprises selecting, by the computer, the agent computer associated with the agent having the skill set required by the high-call-traffic communication manager server from the low-call-traffic communication manager server.

7. The method of claim 6, wherein the processor is further programmed to optimize login of agent computers at communication manager servers in the contact center by logging the agent computer back into the low-call-traffic communication manager server when the call traffic of the high-call-traffic communication manager server goes below the first threshold.

8. A computer-implemented method for optimizing login of agent computers at communication manager servers in a contact center, the computer-implemented method comprising:
    monitoring, by a processor, call traffic at a plurality of communication manager servers in the contact center;
    determining, by the processor, a high-call-traffic communication manager server by determining whether the call traffic at one of the communication manager servers from the plurality of communication manager servers exceeds a first threshold;
    selecting, by the processor, an agent computer associated with an agent having a skill set required by the high-call-traffic communication manager server; and
    dynamically logging, by the processor, the agent computer into the high-call-traffic communication manager server.

9. The computer-implemented method of claim 8, wherein the call traffic comprises telephone calls, web chats, audio messages, video messages, text messages, postings to social media sites, and postings to blog sites.

10. The computer-implemented method of claim 8, further comprising dynamically migrating, by the processor, agent computers to login across the plurality of communication manager servers in order to balance call traffic at the plurality of communication manager servers.

11. The computer-implemented method of claim 8, further comprising monitoring, by the processor, login requests from agent computers.

12. The computer-implemented method of claim 11, wherein selecting, by the processor, an agent computer associated with an agent having a skill set required by the high-call-traffic communication manager server further comprises selecting, by the processor, the agent computer associated with the agent based on the login requests of the agent computers.

13. The computer-implemented method of claim 12, selecting, by the processor, an agent computer associated with an agent having a skill set required by the high-call-traffic communication manager server further comprises selecting, by the processor, the agent computer associated with the agent based upon an affinity of the agent for a geographic location.

14. The method of claim 8 further comprising:
    determining, by the processor, a low-call-traffic communication manager server by determining whether the call traffic at one of the communication manager servers from the plurality of communications manager server is lower than a second threshold;
    wherein selecting, by the processor, an agent computer associated with an agent having a skill set required by the high-call-traffic communication manager server comprises selecting the agent computer associated with the agent having a skill set required by the high-call-traffic communication manager server from the low-call-traffic communication manager server.

15. The method of claim 14 further comprising logging, by the processor, the agent computer back into the low-call-traffic communication manager server when the call traffic of the high-call-traffic communication manager server goes below the first threshold.

16. Computer readable hardware storing computer readable instructions that when executed by a processor causes the processor to:
    monitor call traffic at a plurality of communication manager servers in the contact center;
    determine a high-call-traffic communication manager server by determining whether the call traffic at one of the communication manager servers from the plurality of communication manager servers exceeds a first threshold;
    select an agent computer associated with an agent having a skill set required by the high-call-traffic communication manager server; and log, dynamically, the agent computer into the high-call-traffic communication manager server.

17. The computer-readable hardware of claim 16, further comprising instructions that causes the processor to determine a low-call-traffic communication manager server by determining whether the call traffic at one of the communication manager servers from the plurality of communications manager server is lower than a second threshold; and
  wherein to select an agent computer associated with an agent having a skill set required by the high-call-traffic communication manager server comprises to select the agent computer associated with the agent having the skill set required by the high-call-traffic communication manager server from the low-call-traffic communication manager server.

18. The computer-readable hardware of claim 17, further comprising instructions that cause the processor to log the agent computer back into the low-call-traffic communication manager server when the call traffic of the high-call-traffic communication manager server goes below the first threshold.

\* \* \* \* \*